United States Patent [19]

Strickland et al.

[11] Patent Number: 4,975,095
[45] Date of Patent: Dec. 4, 1990

[54] METHOD OF WINDING AN ELECTROCHEMICAL CELL AND CELL PRODUCED BY THE METHOD

[75] Inventors: John J. Strickland, Alachua; William C. Thibault, Melrose; James D. Handley, Keystone Heights, all of Fla.

[73] Assignee: Gates Energy Products, Inc., Gainesville, Fla.

[21] Appl. No.: 386,535

[22] Filed: Jul. 28, 1989

[51] Int. Cl.$^5$ .............................................. H01M 6/10
[52] U.S. Cl. ................... 29/623.1; 242/56.1; 429/94
[58] Field of Search ................ 429/94; 29/623.1, 730, 29/731, 819; 242/56.1, 67.1, R, 67.5, 76, 7.02; 72/135, 146, 148

[56] References Cited

U.S. PATENT DOCUMENTS

| | | | |
|---|---|---|---|
| 2,340,340 | 2/1944 | Nordberg | 242/56 |
| 2,506,314 | 5/1950 | Nordberg | 242/56 |
| 3,472,696 | 10/1969 | Shoeld | 136/13 |
| 4,064,725 | 12/1977 | Hug et al. | 72/147 |
| 4,203,206 | 5/1980 | Morris et al. | 29/731 |
| 4,212,179 | 7/1980 | Juergens | 72/148 |
| 4,229,865 | 10/1980 | Fanning | 29/25.42 |
| 4,360,140 | 11/1982 | Morris | 226/162 |
| 4,384,687 | 5/1983 | Lamoureux | 242/56.1 |
| 4,539,273 | 9/1985 | Goebel | 429/94 |
| 4,552,821 | 11/1985 | Gibbard et al. | 429/94 X |
| 4,559,700 | 12/1985 | Strickland | 29/623 |
| 4,709,472 | 12/1987 | Machida et al. | 29/623.1 |
| 4,804,152 | 2/1989 | Masuda | 242/67.1 R |
| 4,842,209 | 6/1989 | Saukkonen | 242/56 R |

FOREIGN PATENT DOCUMENTS

0085109 10/1988 European Pat. Off. .
1010183 6/1957 Fed. Rep. of Germany .

*Primary Examiner*—Anthony Skapars
*Attorney, Agent, or Firm*—C. H. Castleman, Jr.; J. L. Isaac; H. W. Oberg, Jr.

[57] ABSTRACT

A method for winding into an electrochemical cell, a plurality of flexible strip members each having a leading end portion, including the steps of positioning a first and second arbor half to face each other but not in contact, feeding the leading end portions between the first and second arbor halves, bringing the arbor halves together to capture at least a portion of the leading end portions, rotating the first and second arbor halves to wrap the leading end portions around a first curvilinear driving surface of the first arbor half, and applying pressure with a roller to the flexible strip members during at least a portion of the time the arbor halves are rotating. An electrochemical cell having a central opening extending the length of the axis of the cell is also described.

18 Claims, 4 Drawing Sheets

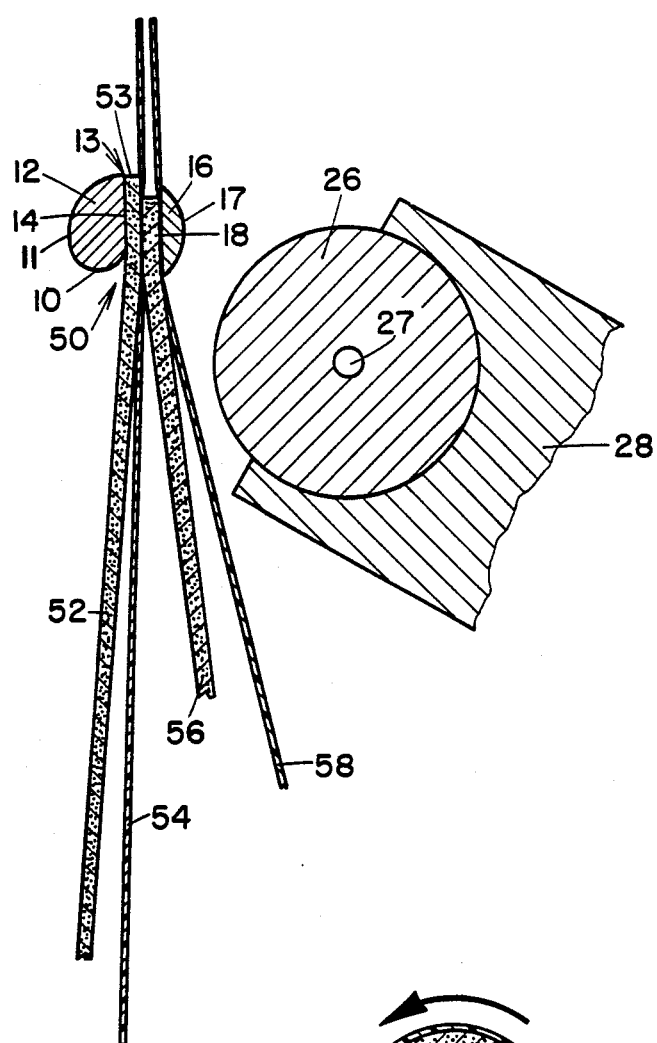
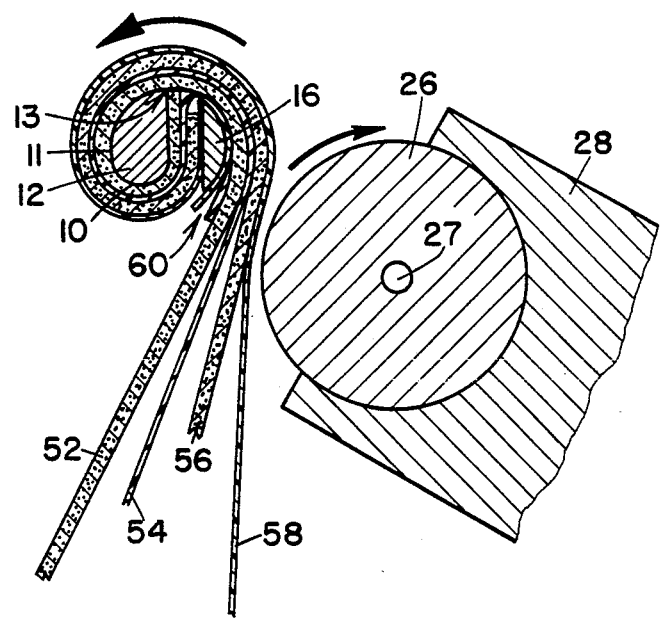

METHOD OF WINDING AN ELECTROCHEMICAL CELL AND CELL PRODUCED BY THE METHOD

BACKGROUND OF THE INVENTION

In general, this invention relates to methods for winding into an electrochemical cell, a plurality of flexible strip members as well as electrochemical cells produced by such methods. More particularly, this invention relates to a method for winding into an electrochemical cell, a plurality of flexible strip members each having a leading end portion, that includes bringing a first generally flat surface of a first arbor half toward a second generally flat surface of a second arbor half along a direction generally perpendicular to the first generally flat surface, to capture at least a portion of the leading end portions therebetween, and rotating the first and second arbor halves with the leading end portions captured, to wrap the leading end portions around a first curvilinear driving surface of the first arbor half; and it relates to an electrochemical cell, produced by such a method, having a central opening that extends the length of the axis of the cell and is circumscribed by a first conducting flexible plate of the cell.

Various techniques and apparatuses for spirally winding electrochemical cells into a generally cylindrical "jelly roll" configuration are known. Typically, a mandrel or split arbor is used to wind the strip-like components of the electrochemical cells. These mandrels or split arbors are either solid with grooves or notched lands, clothespin shaped, or split into two separate halves which slide together (concurrently or at different times) along the same direction to grab and hold the strip-like components for winding. Even if the two arbor halves are tapered such that their tips have the smallest cross-section (see FIG. 6 of U.S. Pat. No. 4,203,206 and FIG. 1 of U.S. Pat. No. 4,559,700), this sliding motion often causes the strip-like components to be pushed-out of, or to buckle between, the arbor halves. Additionally, since the known split arbors slide together, the strip-like cell components must be either (1) fed between the arbor halves in a "pre-sandwiched" form or (2) positioned against an arbor half and held tightly together by some means as shown in FIG. 7C in U.S. Pat. Nos. 4,203,206 and 4,360,140. This adds another step to the winding process and adds another mechanism to the winding apparatus, thus slowing down, adding costs to, and increasing the complexity of the winding process.

Repeatability of high-quality wound cells is low for the known winding processes and apparatuses. In particular, as the arbor halves are pulled from a wound jelly roll, oftentimes the inside windings pull out with the arbor halves causing "spiralling" of the cell. These cells must be scrapped. Furthermore, it is desirable to configure the cells so that cells can easily and quickly be filled with a maximum specified amount of electrolyte. Since cells are usually filled with electrolyte through their centers, it is difficult to easily and quickly fill cell configurations produced by known jelly roll winding processes because the centers of these cell configurations are "filled" with separator material (see FIGS. 7D and 7E of U.S. Pat. Nos. 4,203,206 and 4,360,140) or jelly roll components (see FIG. 15 of U.S. Pat. No. 2,506,314 or FIGS. 24 and 25 of U.S. Pat. No. 2,340,340). A desirable electrochemical cell configuration can be produced by grabbing and winding the leading ends or edges of the malleable conducting plates or electrodes to be wound. However, known cell winding processes and apparatuses do not grab and hold the leading ends or edges of the malleable conducting plates or electrodes because this will cause the leading ends to crack. Therefore, the known processes include methods, where, only the separator strips are grabbed and wound prior to introducing any malleable conducting plates or electrodes (see FIG. 7E of U.S. Pat. Nos. 4,203,206 and 4,360,140).

It is a primary object of this invention to provide a method for winding an electrochemical cell capable of efficiently producing quality cells. It is another object to produce an electrochemical cell by such a method having a configuration that is less costly to make and may extend the life of the cell.

SUMMARY OF THE INVENTION

Briefly described, the invention includes a method for winding into an electrochemical cell, a plurality of flexible strip members each having a leading end portion, comprising the steps of: positioning a first arbor half having a first generally flat surface and a first curvilinear driving surface in spaced relationship with a second arbor half having a second generally flat surface, such that the first and second generally flat surfaces are facing each other but not in contact; feeding the leading end portions at least partially in between the first and second generally flat surfaces; bringing the first and second generally flat surfaces toward one another along a direction generally perpendicular to the first generally flat surface, to capture at least a -portion of the leading end portions therebetween; rotating the first and second arbor halves with the leading end portions captured therebetween, to wrap the leading end portions around the first curvilinear driving surface, and further rotating to form the cell; and applying pressure with a roller to the plurality of flexible strip members during at least a portion of the time the first and second arbor halves are rotating. Also, the invention includes an electrochemical cell, produced by such a method, having a central opening extending the length of the axis of the cell; wherein the plurality of flexible strip members comprises a first and second conducting flexible plate separated by a generally nonconducting separator material, the central opening being circumscribed by the first conducting flexible plate.

BRIEF DESCRIPTION OF THE DRAWINGS

The invention in its preferred embodiments will be more particularly described by reference to the accompanying drawings, in which like numerals designate like parts.

FIG. 3 is an enlarged sectional view taken along 3—3 of FIG. 2 illustrating arbor halves 12 and 16 after strip-like components have been captured therebetween; the position of roller 26 is also illustrated.

FIG. 4 is an enlarged sectional view, similar to that of FIG. 3, illustrating the rotational direction of arbor halves 12 and 16 and roller 26.

DETAILED DESCRIPTION OF THE PREFERRED EMBODIMENTS

Figure 1:
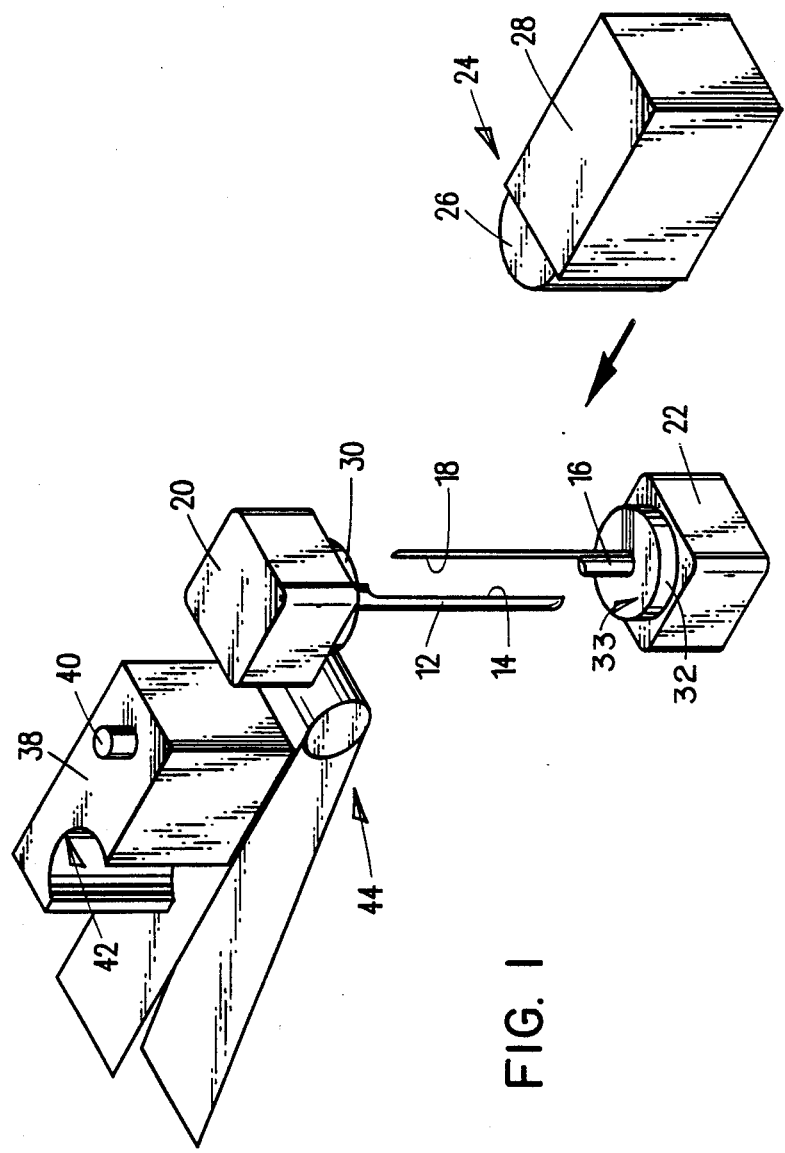
FIG. 1 is a front perspective view of the mechanisms or apparatus useful to carry out a preferred method for winding an electrochemical cell of the invention.

FIG. 1 illustrates arbor halves 12 and 16 spaced apart so that flat surface 14 of arbor half 12 and flat surface 18 of arbor half 16 are facing each other but not in contact. Please see FIG. 3 for an enlarged sectional view of arbor halves 12 and 16. Flat surfaces 14, 18 need not be perfectly smooth or perfectly planar. Lower collar 32 having a generally planar surface 33 is positioned over arbor half 16 in such a way that lower collar 32 can be moved along arbor half 16. Arbor half 16 should be securely fastened to lower block 22 by any fastening means such as threading or press- or interference-fitting the two together. Similarly, arbor half 12 should be securely fastened to upper block 20 by any suitable fastening means such as threading or press- or interference-fitting the two together. It is critical that arbor half 12 be securely fastened to upper block 20 and that arbor half 16 be securely fastened to lower block 22 so that precise movement of upper block 20 will cause precise movement of arbor half 12 and precise movement of lower block 22 will cause precise movement of arbor half 16. Upper and lower blocks 20, 22 as drawn, represent any suitable mechanism capable of being manually or mechanically/automatically driven (by some means, not shown) to move either one or both of arbor halves 12 and 16 laterally (i.e. in the direction toward one another along a direction generally perpendicular to flat surface 14) as well as rotationally. Similar to lower collar 32, upper collar 30 has a generally planar surface (not shown) that faces generally planar surface 33. The function of these two generally planar surfaces will be described below.

Roller assembly 24 shown as roller 26 and roller guide 28 must be capable of precise lateral movement toward arbor halves 12 and 16 as represented by the solid arrow of FIG. 1. Roller 26 must be fastened to roller guide 28 in such a way that allows roller 26 to spin freely around its axis (see 27 in FIG. 3). This can be accomplished by threading a dowel (27 in FIG. 3) which is longer than the length of roller 26, through an oversized hole along the axis of roller 26 and securely fitting the two ends of the dowel, which extend out from the roller 26, into roller guide 28. Positioned behind and slightly to the left of arbor halves 12 and 16 is conveyor belt 44 capable of moving a finished cell containment device 38 from some position away from the winding apparatus to a position where a transfer mechanism (such as that partially shown at 70 in FIG. 5). This transfer mechanism as well as the containment device 38 will be further explained below.

A preferred method for winding strip-like components into an electrochemical cell can begin with positioning arbor halves 12 and 16 as shown in FIG. 1. Sufficient space must be left between flat surfaces 14 and 18 so that the strip-like cell components (not shown) can be fed between arbor halves 12 and 16 from the front.

Figure 2:
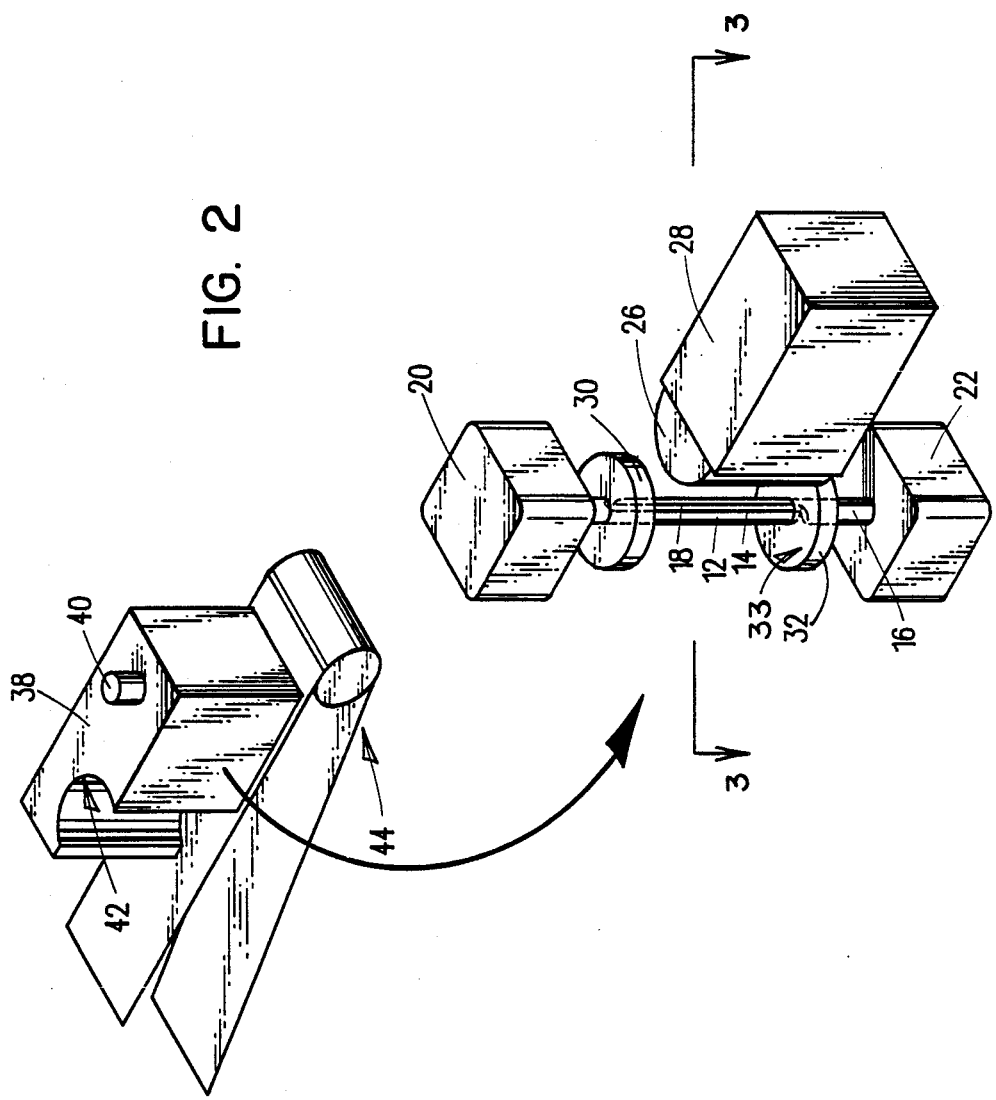
FIG. 2 is a front perspective view, similar to that of FIG. 1, except that arbor halves 12 and 16, upper and lower collars 30 and 32, and roller 26 have been positioned together ready to wind the components of an electrochemical cell (for simplicity, the cell components are not shown in FIGS. 1 or 2).

FIG. 2, which is also absent of the strip-like cell components, illustrates the position of arbor halves 12 and 16 after they have been brought, laterally, toward one another to capture at least a portion of the leading ends (shown as 50 in FIG. 3) of the cell components. This lateral movement can be accomplished by moving either one or both of upper and lower blocks 20, 22. Upper and lower collars 30 and 32 have been moved along arbor halves 12 and 16, respectively, by way of levers or other suitable means (not shown) and positioned so that generally planar surface 33 and the generally planar surface (not shown) of upper collar 30 are a distance from each other equal to at least the average length of the jelly roll to be wound. The two generally planar surfaces will guide the top and bottom edges of the strip-like components to prevent "spiralling" of the cell during its formation. When the generally planar surface (not shown) of upper collar 30 is placed a distance from generally planar surface 33 equal to at least the average length of the cell, which is the situation shown in FIG. 2, the upper collar 30 is positioned around the lower part of arbor half 12 and the tip of arbor half 16 and lower collar 32 is positioned around the lower part of arbor half 16 and the tip of arbor half 12. This locks the arbor halves together. Locking the arbor halves together in this manner can prevent them from splitting apart during rotation. A cell wound around arbor halves which have split apart during rotation will likely be wound too loosely to function properly. Locking the arbor halves becomes critical as the rotation rate increases.

FIG. 2 also illustrates the position of roller 26, between upper and lower collars 30, 32, where roller 26 can be used to apply pressure to the cell components during at least a portion of the process to wind the cell components around arbor halves 12 and 16. To fit roller 26 between collars 30 and 32, the length of roller 26 should be less than the average length of the cell being wound. For example, one can leave 0.030" between each collar 30, 32 and the roller 26 when positioned as shown in FIG. 2, by making the roller 0.060" shorter than the . average length of the cell being wound. The arrow leading from containment device 38 to the winding apparatus illustrates the direction from which the device 38 will be transferred by transfer mechanism 70 (FIG. 5) to pick up a cell that is being wound. It is preferred that the containment device 38 surround the cell at a time prior to the last/final winding of the cell. More preferably, device 38 should surround the cell after two-thirds of it has been wound. The rotation of arbor halves 12 and 16 need not pause to wait for the device 38 to be postioned around the cell. Containment device 38 can be configured with a positioning dowel 40 and an indented surface 42. Preferably, the indented surface 42 is a semi-circle with a diameter generally equal to the average outer diameter of a finished electrochemical cell so that containment device 38 can carry a formed cell away from the winding apparatus.

The sectional view of FIG. 3 illustrates the leading end portions (shown at 50) of flexible strip members 52, 54, 56, and 58 captured between generally flat surface 14 of arbor half 12 and generally flat surface 18 of arbor half 16. Preferably, the cross-section of arbor half 12 is outlined by curvilinear driving surface 10, a curvilinear trailing surface 11, generally flat surface 14, and trailing edge 13. Arbor half 12 will have substantially this cross-section from its tip throughout a length of the arbor half greater than the length of a cell to be wound (see FIG.

1). Preferably, curvilinear trailing surface 11 has a diameter greater than the diameter of curvilinear driving surface 10. Although the arbor half 12 need not be configured exactly as shown, it is critical that there exist a curvilinear driving surface around which the innermost flexible strip member can wrap. Flexible strip members 52 and 56 can be conducting flexible plates, in particular 52 can be the negative electrode and 56 can be the positive electrode of an electrochemical cell. Shown at 53 is the leading edge of conducting flexible plate 52. Similarly, conducting flexible plate 56 has a leading edge (not numbered). It is preferred that flexible strip members 54 and 58, which can be made of generally nonconducting separator material, extend past trailing edge 13. It is also preferred that the leading edges of conducting flexible plates 52 and 56 do not extend very far beyond trailing edge 13. The advantages of the cell configuration which results when flexible strip members 52, 54, 56, and 58 are captured as shown in FIG. 3 will be explained below.

After the leading end portions 50 of the flexible strip members 52, 54, 56, and 58 have been captured, roller 26 can be positioned so that its perimeter is a distance from the outer surface 17 of arbor half 16 equal to at least the sum of the thicknesses of the flexible strip members. If pressure is to be applied to the flexible strip members, it is generally desirable to not apply pressure with roller 26 until at least one winding, or preferably one and one-quarter winding, has been completed. Roller guide 28 is preferably connected to a spring (not shown) such as an air spring or helical wire spring, that allows the roller 26 to move in a direction toward its original position (see FIG. 1) as the diameter of a cell being wound increases. The spring tension should be set so that a predetermined pressure is consistently applied to the perimeter of a cell as it is being wound. This "spring-loaded" roller can help control the tightness of cell windings.

FIG. 4 illustrates one complete rotation of arbor halves 12 and 16 after having captured the leading ends (shown at 50 in FIG. 3) of flexible strip members 52, 54, 56, and 58. Preferably, arbor halves 12 and 16 rotate counter clockwise as shown. Rotation of freely spinning roller 26 will begin after roller 26 contacts separator strip 58. Preferably, contact between roller 26 and separator strip 58 will occur after approximately one and one-quarter rotations have been completed by arbor halves 12 and 16. Once this contact is made, roller 26 will rotate in the direction shown by its arrow. One can see that, as a result of capturing the leading edge (53 in FIG. 3) of conducting flexible plate 52 so that it does not extend substantially beyond trailing edge 13, this leading edge abutts the first loop of conducting flexible plate 52 to form the initial winding of a jelly roll capable of being tightly wound around arbor halves 12 and 16. As a result of extending (see FIG. 3) a portion of the leading ends of separator strips 54, 58 slightly past trailing edge 13, conducting flexible plate 52 does not contact the outer surface (17 in FIG. 3) of arbor half 16, but instead contacts "split tail" 60. The advantages of winding an electrochemical cell configured so that conducting flexible plate 52 contacts split tail 60 will be explained below.

Flexible strip members 52, 54, 56, and 58 can be fed between open arbor halves 12, 16 (see FIG. 1) as pre-measured, cut strips or continuous strips stored on spools, for example (not shown). Any suitable means for advancing and correctly positioning the leading ends (50 in FIG. 3) can be used for the winding process. Although not shown, the leading end (50 in FIG. 3) can be "presandwiched" prior to being fed between arbor halves 12 and 16. Although also not shown, a means for guiding the flexible strip members 52, 54, 56, and 58 into place between open arbor halves 12 and 16 can be used. For example, a system of rollers or a grooved track could function as a means for guiding the flexible strip members.

Figure 5:
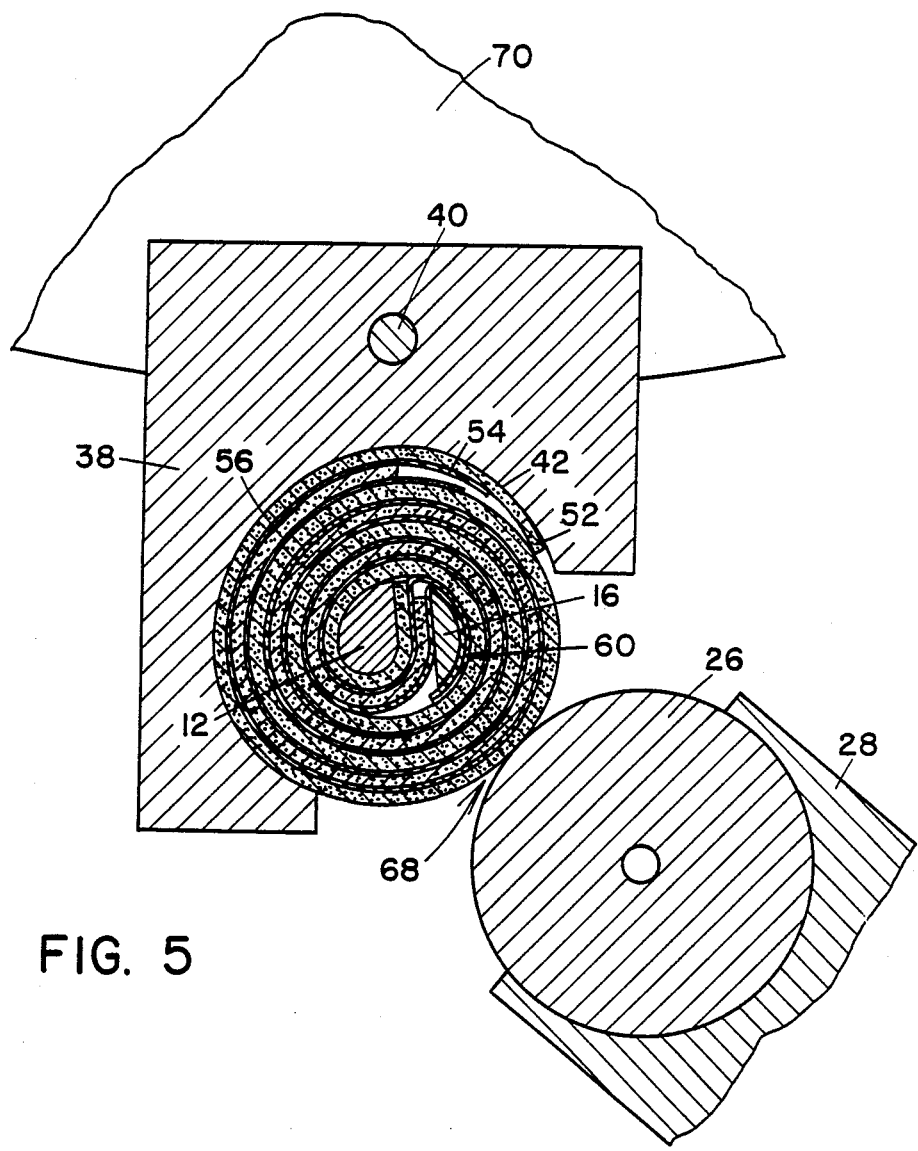
FIG. 5 is an enlarged sectional view of a completed, preferred cell of the invention surrounded by containment device 38.

The completed jelly roll of FIG. 5 has been surrounded by containment device 38. Since conducting flexible plate 52 makes up the outer layer of the jelly roll, it is the component of the jelly roll which contacts indented surface 42. Transfer mechanism 70 (shown in part) can be a motor- or manually-driven arm or wheel capable of accepting and precisely positioning containment device 38 to surround the jelly roll as explained above. Freely spinning roller 26 can remain in contact (shown at 68) with the outer layer of the flexible strip members 52, 54, 56, and 58 until completion of the last-/final winding to ensure that the jelly roll does not unwind.

It is critical that roller 26 be moved out of the way and that arbor halves 12 and 16 be pulled out from the center of the jelly roll prior to transferring the containment device 38 with the jelly roll contained therein, away from the winding apparatus. Once the electrochemical cell has been surrounded by containment device 38 and the final winding of the cell has been completed, roller guide 28 can be retracted to its original position (see FIG. 1). The step of pulling out or retracting arbor halves 12 and 16 can be performed prior to moving collars 30 and 32 along arbor halves 12 and 16, respectively, away from the jelly roll, so that the center windings of the jelly roll are held in place by collars 30 and 32 while arbor halves 12 and 16 are retracting. Roller 26 can be retracted at the same time, or after, arbor halves 12 and 16 are being retracted.

Figure 6:
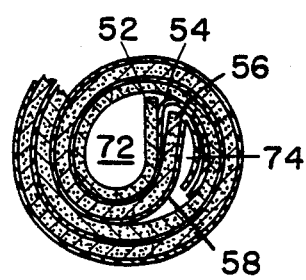
FIG. 6 is an enlarged sectional view of the first few windings of a preferred cell of the invention after arbor halves 12 and 16 have been pulled out.

FIG. 6 illustrates the configuration of the first few windings of a jelly roll produced by the preferred winding process described above. Advantages of an electrochemical cell configured as shown are many. The opening which results from removing arbor half 16 is shown at 74. Space 74 provides room for the leading end portion of conducting flexible plate 56 to "relax" against a triple layer of generally nonconducting separator material. Thus, no pressure point is created between the leading edge (not numbered) of conducting flexible plate 56 and conducting flexible plate 52. This is desirable because pressure points within an electrochemical cell oftentimes become shorts within the cell during use. Unwanted shorts within an electrochemical cell can damage or destroy the cell. Note that the leading edges of conducting flexible plates 52 and 56 are separated from each other by separator strip 54. Central opening 72, extending the length of the axis of the jelly roll, is generally circumscribed by conducting flexible plate 52. An electrochemical cell configured with a relatively large central opening such as that shown at 72, can make it easier and/or quicker to fill a cell with electrolyte. Furthermore, since the central opening 74 is generally circumscribed by conducting flexible plate (or negative electrode) 52, welding of conducting flexible plate 52 to an outer can containing the jelly roll to provide a conducting pathway therebetween, is more easily accomplished.

By way of example, a sub-C sealed nickel-cadmium rechargeable battery cell can be wound using the preferred process of the invention as described above. The flexible strip members of such a nickel-cadmium battery cell would include: a negative electrode produced by known techniques containing cadmium metal which is oxidized to cadmium hydroxide during discharge; a positive electrode produced by known techniques containing nickel oxyhydroxide which is reduced to nickel hydroxide on discharge; and two separator strips made from woven and/or nonwoven fabrics or porous plastic. The sub-C battery cell is approximately 1.4 inches long and has a finished outer diameter of approximately 0.825 inches and is made up of approximately 5½ windings of flexible strip members. Various metals or metal alloys suitable for high volume production of cells can be used to fabricate the following: the containment device; two arbor halves; two collars; the upper and lower block; and the roller. The length of arbor half 12 which has the semi-circular cross-section would be approximately 2 and 7/64 inches. The length of arbor half 16 that has the semi-circular cross-section would also be 2 and 7/64 inches. The lower part of arbor half 12 and the lower part of arbor half 16 (which are not press-fit into the upper or lower blocks) can each be machined to a diameter of 0.250 inches. The portion of arbor halves 12 and 16 which are press-fit into upper and lower block 20 and 22 respectively can be machined to have diameters of approximately 0.188 inches. The winding apparatus and mechanisms of this example were motor-driven and electronically controlled/operated.

While certain representative embodiments and details have been shown for the purpose of illustrating the invention, it will be apparent to those skilled in this art that various modifications may be made to the invention without departing from the spirit or scope of the invention.

What is claimed is:

1. A method for winding into an electrochemical cell, a plurality of flexible strip members comprising a first conducting flexible plate, each flexible strip member having a leading end portion, comprising the steps of:
   positioning a first arbor half having a first generally flat surface and a first curvilinear driving surface in spaced relationship with a second arbor half having a second generally flat surface, such that said first and second generally flat surfaces are facing each other but not in contact;
   feeding the leading end portions at least partially in between said first and second generally flat surfaces still facing each other but not in contact;
   bringing said first and second generally flat surfaces toward one another along a direction generally perpendicular to said first generally flat surface, to capture at least a portion of the leading end portions therebetween;
   rotating said first and second arbor halves with the leading end portions captured between said first and second generally flat surfaces, to wrap the leading end portions around said first curvilinear driving surface, and further rotating to form the cell; and
   applying pressure with a roller to the plurality of flexible strip members during at least a portion of the time said first and second arbor halves are rotating, said roller being capable of spinning freely.

2. The method of claim 1 wherein said second arbor half has a second outer surface, and further comprising the step of positioning the perimeter of said roller a distance from said second outer surface equal to at least the sum of the thicknesses of the plurality of flexible strip members.

3. The method of claim 2 wherein said step of positioning the perimeter of said roller is performed prior to said step of rotating said first and second arbor halves with the leading end portions captured.

4. The method of claim 1 further comprising the step of providing a generally planar upper guide surface and a generally planar lower guide surface such that said upper and lower guide surfaces are a distance from each other equal to at least the average length of the cell, said upper and lower guide surfaces to retain the plurality of flexible strip members therebetween while said first and second arbor halves are rotating to form the cell.

5. The method of claim 4 wherein an upper collar comprises said generally planar upper guide surface and a lower collar comprises said generally planar lower guide surface.

6. The method of claim 5 when said upper and lower guide surfaces are at a distance from each other equal to at least the average length of the cell, said upper collar is over a portion of both of said first and second arbor halves and said lower collar is over a portion of both of said first and second arbor halves.

7. The method of claim 4 wherein said step of providing a generally planar upper guide surface and a generally planar lower guide surface is performed after said step of bringing said first and second generally flat surfaces toward one another and prior to said step of rotating said first and second arbor halves with the leading end portions capture.

8. The method of claim 1 wherein: the leading end portion of the first conducting flexible plate has a first leading edge; said first generally flat surface has a trailing edge; and said first leading edge is captured so that said first leading edge does not extend substantially beyond said trailing edge.

9. The method of claim 1 further comprising the step of surrounding at least a portion of the perimeter of the cell with a containment device prior to completion of the final winding of the cell, said containment device having an indented curvilinear portion with a diameter generally equal to the average outer diameter of the cell after being formed.

10. The method of claim 9 further comprising the step of transferring said con device after the cell has been formed, to move the cell away from its position during formation.

11. The method of claim 1 wherein said first arbor half has a cross-sectional area greater than the cross-sectional area of said second arbor half, and said first arbor half further comprises a first curvilinear trailing surface connected to said first curvilinear driving surface.

12. The method of claim 11 wherein: said first generally flat surface has a trailing edge; said first curvilinear trailing surface has a diameter greater than a diameter of said first curvilinear driving surface; and said first curvilinear trailing surface is connected to said trailing edge.

13. An electrochemical cell, produced by the method of claim 1, having a central opening extending the length of the axis of the cell; wherein the plurality of flexible strip members further comprises a second conducting flexible plate separated from the first conducting flexible plate by a generally nonconducting separator material, said central opening being circumscribed by said first conducting flexible plate.

14. The electrochemical cell of claim 13 wherein said first conducting flexible plate comprises electrochemically reactive cadmium material and said second conducting flexible plate comprises electrochemically reactive nickel material.

15. A method for winding into an electrochemical cell, a plurality of flexible strip members comprising a first conducting flexible plate having a first leading edge and a second conducting flexible plate having a second leading edge, comprising the steps, performed in the sequence listed, of:

positioning a first arbor half having a first generally flat surface and a first curvilinear driving surface in spaced relationship with a second arbor half having a second generally flat surface, such that said first and second generally flat surfaces are facing each other but not in contact, said first generally flat surface having a trailing edge;

feeding the first and second leading edges between said first and second generally flat surfaces still facing each other but not in contact, the plurality of flexible strip members not in contact with said first and second generally flat surfaces;

bringing said first and second generally flat surfaces toward one another along a direction generally perpendicular to said first generally flat surface, to capture the first and second leading edges therebetween so that the first and second leading edges do not extend substantially beyond said trailing edge; and rotating said first and second arbor halves with the first and second leading edges captured, to wrap the plurality of flexible strip members around said first curvilinear driving surface, and further rotating to form the cell.

16. The method of claim 15 further comprising the step of positioning an upper collar having a generally planar upper guide surface and a lower collar having a generally planar lower guide surface such that said upper and lower guide surfaces are a distance from each other equal to at least the average length of the cell, said upper and lower guide surfaces to retain the plurality of flexible strip members therebetween while said first and second arbor halves are rotating to form the cell.

17. The method of claim 16 further comprising the step of applying pressure with a roller to the plurality of flexible strip members during at least a portion of the time said first and second arbor halves are rotating with the first and second leading edges captured, said roller being capable of spinning freely.

18. An electrochemical cell, produced by the method of claim 15, having a central opening that extends the length of the axis of the cell and is circumscribed by said first conducting flexible plate; wherein said first and second conducting flexible plates are separated by a generally nonconducting separator material and said second leading edge is separated from said first conducting flexible plate by at least two layers of said generally nonconducting separator material.

* * * * *